Figure 1:
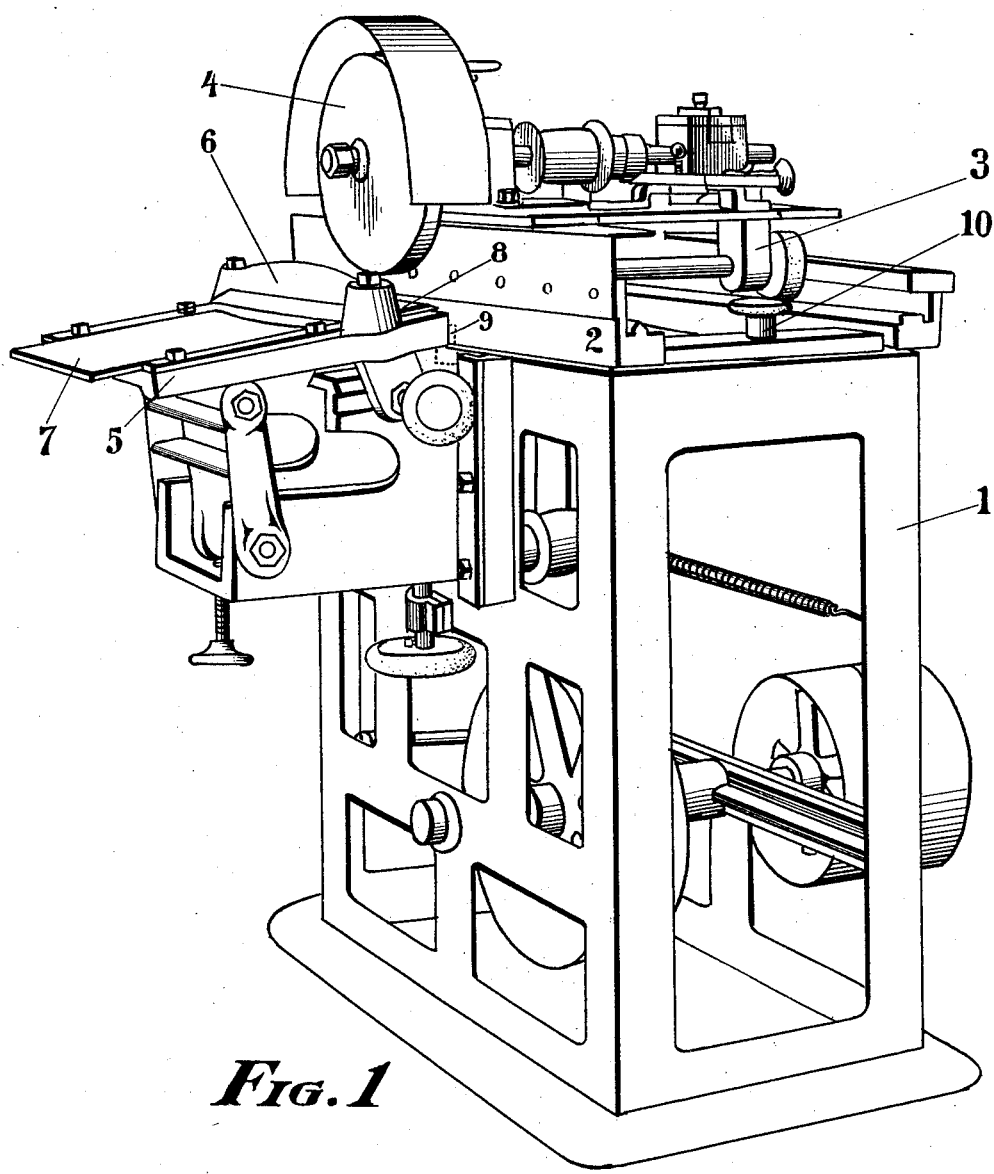

J. P. HEDSTROM.
WHEEL ADJUSTING DEVICE FOR LAP GRINDING MACHINES.
APPLICATION FILED JUNE 15, 1912.

1,053,389.

Patented Feb. 18, 1913.

2 SHEETS—SHEET 1.

J. P. HEDSTROM.
WHEEL ADJUSTING DEVICE FOR LAP GRINDING MACHINES.
APPLICATION FILED JUNE 15, 1912.

1,053,389.

Patented Feb. 18, 1913.
2 SHEETS—SHEET 2.

WITNESSES:
Geo. W. Smith.
Christine A. Braidel.

John P. Hedstrom. INVENTOR

BY Geo. B. Willcox ATTORNEY

UNITED STATES PATENT OFFICE.

JOHN P. HEDSTROM, OF BIG RAPIDS, MICHIGAN.

WHEEL-ADJUSTING DEVICE FOR LAP-GRINDING MACHINES.

1,053,389. Specification of Letters Patent. Patented Feb. 18, 1913.

Application filed June 15, 1912. Serial No. 703,991.

*To all whom it may concern:*

Be it known that I, JOHN P. HEDSTROM, a citizen of the United States, residing at Big Rapids, in the county of Mecosta and State of Michigan, have invented certain new and useful Improvements in Wheel-Adjusting Devices for Lap-Grinding Machines; and I do hereby declare the following to be a full, clear, and exact description of the invention, such as will enable others skilled in the art to which it appertains to make and use the same.

This invention relates to grinding machines and pertains more particularly to lap grinding machines such as are commonly used for beveling the ends of band saws preparatory to lapping and brazing them.

My present improvement relates more particularly to means for adjusting the travel of the grinding wheel with relation to the end of the saw blade to secure a more uniform and perfect bevel.

Heretofore lap grinders have been employed in which the grinding wheel is traversed horizontally across the end of the saw blade, the grinding wheel being mounted on a carriage, and the saw blade being held in stationary clamped position at the side of the carriage, the end of the saw blade projecting beyond the clamping device in the path of travel of the grinding wheel.

It has been found in practice that the saw blades are seldom perfectly flat and that when such a blade is received in the clamp, that part of the blade immediately between the clamping surfaces is flattened, but the projecting free end of the blade upon which the grinding wheel acts is thereby curved and distorted. When this happens, there being no means for varying the travel of the grinding wheel from its original direction as fixed by the carriage upon which the grinding wheel rides, it follows that the high parts of the projecting free end of the blade will be ground more than the low parts, resulting in an uneven bevel that extends farther back at some places along the width of the blade than at others, whereas a perfect lap and satisfactory brazing requires that the ends of the blade shall be formed with uniform bevels that fit together accurately when the ends of the blade are brought together for brazing.

To overcome this objection to former lap grinding machines and to provide means for easily and quickly changing the direction of travel of the grinding wheel as it passes across the end of the blade and to thereby provide a uniform lap on a blade that is even slightly warped, is the purpose of my present improvement.

With this object in view and certain others which will appear later in the specification, my invention consist in the devices described and claimed and the equivalents thereof.

Figure 2:
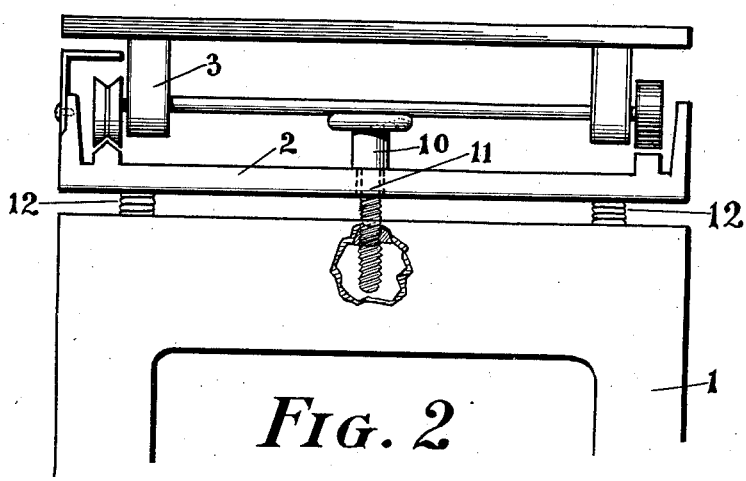
Figure 3:
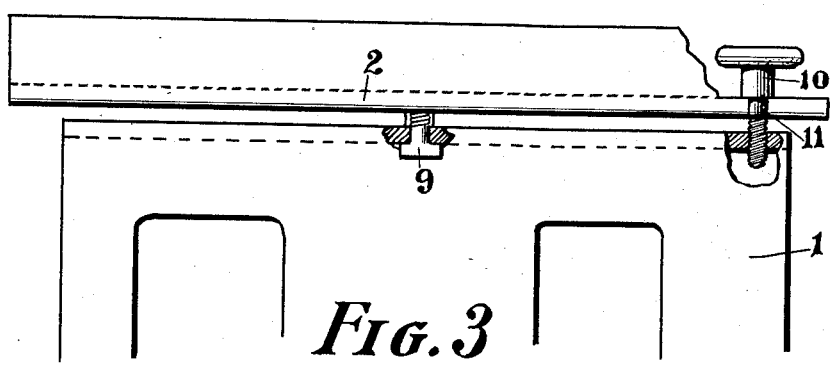
Figure 4:
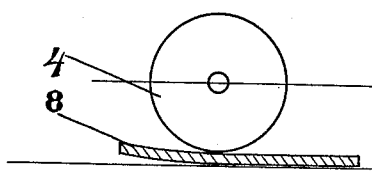
Figure 5:
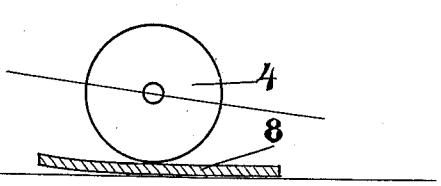

In the drawings, Figure 1 is a perspective view of a lap grinding machine embodying my improvement; Fig. 2 is an end elevation broken away in part, showing the adjusting device; Fig. 3 is a partial side view of the frame of the machine; Fig. 4 is a diagrammatic view showing the relation of the grinding wheel to the warped or twisted end of a saw blade which is being ground; and Fig. 5 is a similar diagrammatic view showing the change in direction of the grinding wheel affected by means of my improved adjusting device whereby a uniform bevel is obtained on the warped end of the saw.

1 represents the frame of the machine upon which I mount an auxiliary frame 2 capable of being slightly tilted, as will be presently described. Upon the auxiliary frame is mounted a rolling carriage 3 carrying a revoluble grinding wheel 4. The carriage 3 may be traversed back and forth along the auxiliary frame 2 by hand or in any other suitable manner as in ordinary machines of this character. Secured to the frame of the machine is the usual table 5 provided with a clamping member 6 by which the saw blade 7 is secured to the table, the free end 8 of the saw blade projecting beyond the edge of the table and underneath the path of travel of the grinding wheel 4.

As has been previously mentioned, a slightly warped saw blade will be flattened under the clamp 6, but its free end 8 will be correspondingly warped or distorted, as indicated in an exaggerated manner diagrammatically in Fig. 4. It will be readily seen that if wheel 4 were compelled to travel in a horizontal direction, as would be the case if auxiliary frame 2 were fixed, the left hand edge of the blade shown in Fig. 4 would be ground more than the right hand edge, resulting in an uneven bevel.

To enable the line of travel of grinding wheel 4 to adapt itself to the warped condition of the blade, I provide means for rocking or tilting the auxiliary frame 2 while the grinding wheel is traversing the blade. As a preferred means for tilting the auxiliary frame I provide rocking pins 9 carried by the frame 1, and projecting into recesses in the bottom of auxiliary frame 2, the pins being located approximately in the middle of the length of the frame. At one end of auxiliary frame 2 I provide an adjusting screw 10 passing loosely through a hole 11 in the frame 2 and threaded into a corresponding hole in the frame 1, so that by tightening adjusting screw 10 the end of the auxiliary frame will be forced downward. To restore the auxiliary frame to its original position I provide a pair of compression springs 12 between the bottom of auxiliary frame 2 and the top of frame 1 so that loosening screw 10 will allow the end of auxiliary frame 2 to rise. By this means I am enabled to change at will through a sufficient angle, the line of travel of grinding wheel 4, as indicated in Fig. 5, to conform to the warped condition of the blade, however slight the warp may be, so that a true and even bevel is obtained.

While I have shown and described a specific means for effecting the adjustment of the travel of the grinding wheel, it will be understood that various modifications may be made in it without departing from the spirit of my invention.

Having described my invention, what I claim and desire to secure by Letters Patent, is:—

1. In a lap grinding machine, the combination with a frame, of an auxiliary frame tiltingly mounted thereon, a traveling carriage mounted on said auxiliary frame, a revoluble grinding wheel on said carriage, a saw-clamping device, and means for tilting said auxiliary frame, for the purposes set forth.

2. In a lap grinding machine, the combination with a frame, of an auxiliary frame tiltingly mounted thereon, a traveling carriage mounted on said auxiliary frame, a revoluble grinding wheel on said carriage, a saw-clamping device, and an adjusting screw adapted to tilt one end of said auxiliary frame.

3. In a lap grinding machine, the combination with a frame, of an auxiliary frame tiltingly mounted thereon, a traveling carriage mounted on said auxiliary frame, a revoluble grinding wheel on said carriage, a saw-clamping device, an adjusting screw engaging said frame and auxiliary frame, and compression springs interposed between said frames, for the purposes set forth.

In testimony whereof, I affix my signature in presence of two witnesses.

JOHN P. HEDSTROM.

Witnesses:
CHRISTINE A. BRAIDEL,
GEO. W. SMITH.

Copies of this patent may be obtained for five cents each, by addressing the "Commissioner of Patents, Washington, D. C."